May 13, 1941.　　　G. CONTRINO ET AL　　　2,241,877
VEHICLE ELEVATING DEVICE
Filed Sept. 25, 1940

INVENTORS;
Gaspare Contrino,
Giuseppe Callari,
By Harold D. Penney.

Patented May 13, 1941

2,241,877

UNITED STATES PATENT OFFICE 2,241,877

VEHICLE ELEVATING DEVICE

Gaspare Contrino and Giuseppe Callari, Bronx, N. Y.

Application September 25, 1940, Serial No. 358,264

11 Claims. (Cl. 254—86)

This invention relates to vehicle elevating and lowering means and more particularly to inbuilt jacks, though it is noted that in some of the claims the invention is not limited to inbuilt jacks.

One object of the invention is to provide an improved device or apparatus of this kind which effects elevation and descension of a vehicle by an operator within the vehicle.

Other objects of the invention are to provide an improved device of this kind which eliminates the necessity of temporarily placing a jack in difficultly accessible locations under the vehicle whenever repairs to wheels and tires are made.

Additional objects of the invention are to effect simplicity and efficiency in such devices and to provide an extremely simple device of this kind which is economical, durable, and reliable and convenient in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with an improvement in emergency jack or lifting apparatus for vehicles such as automobiles and the like.

One of the important advantages of the present invention relates to the provision and means of a permanent, normally inoperative lifting apparatus whereby the vehicle, such as an automobile may be operatively lifted entirely clear of the road, as and when required.

Normally such an apparatus is inoperative and mounted in such a position in connection with the chassis that it is out of contact with the road but may at any time as desired be controlled to become operative and lift the vehicle from the road, and while manually controlled, it may be utilized to either lift the vehicle from the road or lower the vehicle back into direct contact with the road.

This latter feature becomes especially desirable in the event that if one or more tires are punctured, the device enables the driver to lift the vehicle so that such tires may be either removed, repaired, or replaced by spare tires.

Another advantage of the present improvement is that it becomes useful in the event that it becomes bogged in a ditch or on a dirt road.

A further advantage is to do away with the necessity of using ordinary jacks which have to be manually applied or set to the under body of the car in the heretofore customary manner.

It also becomes obvious that by the present improvement the vehicle may be lifted from the road, and by the operator within the car or vehicle without having to leave the vehicle until the vehicle is properly elevated.

In the accompanying drawing showing, by way of example, two of many possible embodiments of the invention—

Figure 1:
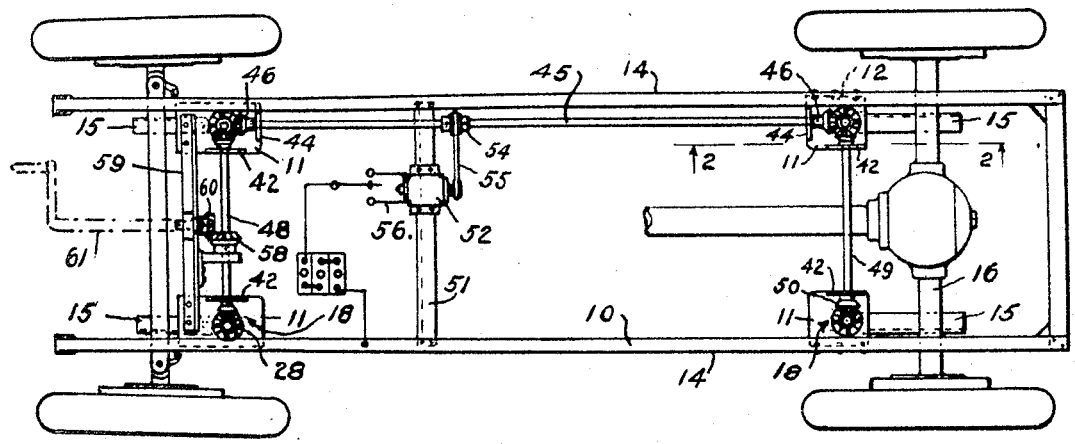
Fig. 1 is a plan showing the elevating device mounted on a chassis.
Figure 2:
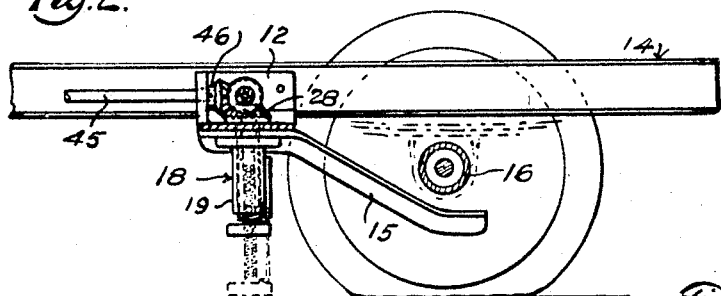
Fig. 2 is a fragmental longitudinal sectional view, the section being taken substantially on the line 2—2 of Fig. 1, looking in the direction of the arrows of said line.

A vehicle chassis 10 has four platforms 11, associated with said chassis substantially near the respective corner portions of the chassis, each of said platforms having an upturned flange 12 mounted on the inner side faces of the side frames 14 of the chassis. Each of said platforms is provided with a large axially vertical hole 13 therethrough.

An axle supporting arm 15 is mounted on the under face of each of said platform and each has a hole in axial alignment with and larger than said vertical hole and projecting under the chassis axles and is so arranged as to lift the axles as the chassis is raised and to allow free springing movement of the axles while the vehicle is in operation.

A jack 18 is located under each of said platforms and each jack comprises a hollow housing 19 pending from the mounted end of said arm 15 and provided with a flange 20 at the upper end thereof and with a threaded vertical opening 21 at the bottom, said housing being mounted under said platform 11 by means of screws 22 passing through said flange 20 and arm 15 and into said platform. An externally threaded vertical sleeve 24 is rotatably mounted in said threaded opening 21 and receivable in said housing 19 and is provided with a longitudinal external driving slot 25 and has internal threads 26 of opposite pitch to the external threads.

A tubular vertical drive member 27 is rotatably received in the space between said sleeve 24 and housing 19 and has its upper portion 27' of reduced diameter to form an upwardly facing shoulder 30 engaging the platform 11, said upper portion 27' projects upwardly through and bears in said hole in the platform. The said member has at the lower end an internal projection 31 engaging said slot 25 and has internal threads 26 in the top portion. A miter jack gear 28 is disposed on the upper face of the platforms 11 and is keyed on said upper portion of the drive member 20. A cap 29 is screwed into said drive member and has its lower peripheral margin engaging the upper hub face of said jack gear 28 to hold said member and gear in operable position. A core screw 32 is engaged in the internal threads 26 of said sleeve 24 and has a foot 34 at the lower end. The sleeve and screw cooperate to form a compound screw.

A vertically telescoping stay 35 is provided to prevent said foot and core screw 32 from rotating with said sleeve 24, and comprises a series of tubes assembled in telescope fashion, the one or more intermediate tubes 36 each having an outstanding flange 38 at its upper end and an internal retaining flange 39 at its lower end. The outside tube 40 has a retaining flange 39' at its lower end and has its upper end mounted on said housing 19, while the inside tube 41 has an outstanding flange 38 at its upper end and has its lower end mounted on said foot. The outstanding flanges 38 are adapted to engage the retaining flanges of the adjacent larger tube, and prevent pulling apart of the stay. Each platform 11 is provided with an inner upturned vertical wall 42 parallel to the longitudinal axis of the chassis and has transverse bearing holes therein; the transverse bearing holes in the walls of the two front and the two rear platforms being in transverse axial alignment. Two of the platforms on the same side of the chassis each is provided with a vertically upturned inner wall 44 lying in a plane substantially perpendicularly to the longitudinal axis of the chassis and has longitudinally axially aligned bearing holes therein.

A lengthwise shaft 45 extends through the longitudinally axially aligned bearing holes and carries miter gears 46 at each end thereof engaging the respective jack gears 28. A front and a rear cross shaft 48, 49 each extends through the transverse axially aligned bearing holes in the walls near the front and rear ends of the chassis respectively and carry miter gears 50 at each end and engage the jack gears.

A motor support 51 is transversely mounted on said chassis at a portion between the front and rear platforms on which support is mounted a reversible motor 52 to drive a pulley 54 on said lengthwise shaft 45; through a belt 55 connecting the pulley and the motor. A reversing switch 56 is provided for the motor 52. For an auxiliary drive means a miter toothed wheel 58 is mounted on the front cross shaft 48 between the platforms 11 supporting it. A cross member 59 is mounted on the two front platforms. A miter pinion 60 engaging said wheel and shaft, are adapted to be turned by a hand crank 61 and rotatably mounted on the cross member.

Figures 3, 4:
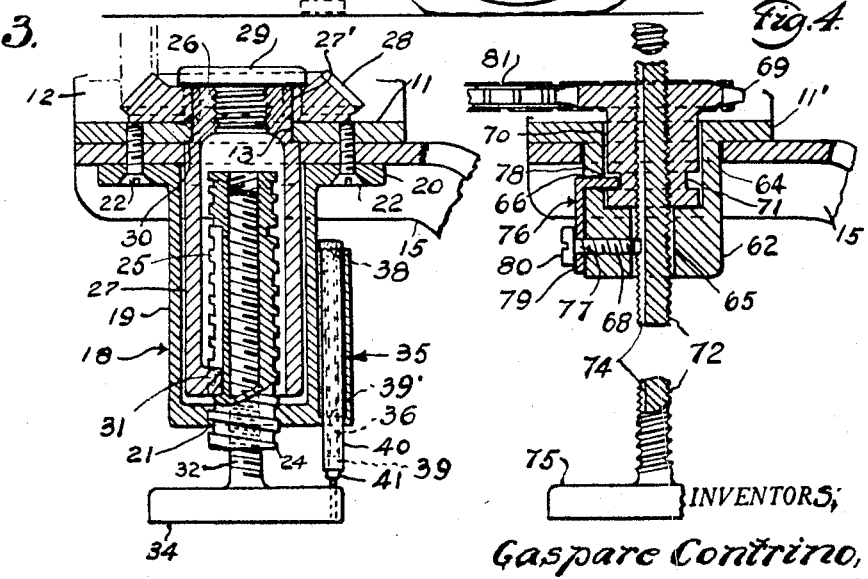
Fig. 3 is an enlarged fragmental axial longitudinal vertical sectional view, partly in elevation, showing the jack in Fig. 2.
Fig. 4 is a fragmental axial longitudinal vertical sectional view, partly in elevation, showing a modified form of the device.

Another embodiment of the invention is shown in Fig. 4, the platform 11' being mounted as in Fig. 1.

Each platform 11' has a boss 62 pending therefrom with a large vertical bearing bore 64 extending through said platform and boss, the lower portion 65 of the bore being of reduced diameter. The boss is provided with a radial slot 66 communicating with the large portion of the bore and with a threaded aperture 68 communicating with the reduced portion.

A sprocket 69 is provided with a downwardly extending hub 70 bearingly received with larger portion of the bore 64 and having a circumferential groove 71 in the lower portion thereof. The sprocket and hub are provided with a threaded vertical bore. A jack screw 72 slidable in the reduced portion of the boss bore is provided with a longitudinal slot 74. The jack screw engages the thread of the sprocket bore and has a foot piece 75 mounted on its lower end.

An angular retaining piece 76 has one member 78 projecting through the radial slot 66 and engaging in the groove 71, the other member 79 has an aperture 77. A screw 80 passing through the last mentioned aperture engages the threads of the aperture 68, and loosely engages in the slot 74. The screw 80 thus has the double function of mounting the retaining piece 76 and also preventing the jack screw from rotating.

A chain 81 is employed to drive the sprocket 62. The motor 52 may be provided with a vertical shaft carrying a hand wheel and an axially vertical drive sprocket lying in substantially the same plane as the jack sprockets 69. The chain 81 may pass around all four jack sprockets 69 with an inwardly directed loop of the chain passing around said drive sprocket. For an additional alternative operating means the shaft of the motor 52 may carry a motor miter gear engaging a side miter gear carried on a transverse hand crank shaft mounted under the support 51 by means of bearings.

The chain 81 affords a simple transmission means for any number of jacks. Three jacks may be located in tripod fashion, as one under the front part of the chassis and two under the rear part, and having the chain pass around the three sprockets and engaging a drive sprocket.

The invention claimed is:

1. In combination a vehicle chassis; four platforms each having an axially vertical bearing hole therethrough; and mounted on the chassis near the respective corners of the chassis; a jack pendingly mounted under each of said platforms; and having a vertical rotary drive member projecting upwardly through said bearing hole; a miter jack gear disposed on the upper face of the platforms and keyed on said upper portion of the drive member; each platform being provided with a transverse bearing axially parallel to the transvere axis of the chassis; the transverse bearings of the two front and also the two rear platforms being in transverse axial alignment respectively; the platforms on one side of the chassis being provided with axially longitudinal alined bearings parallel to the longitudinal axis of the chassis; a lengthwise shaft extending through the longitudinally aligned bearings and having miter gears at each end thereof engaging the respective jack gears on said one side; front and rear cross shafts extending through said transverse bearings near the front and rear ends respectively of the chassis and having miter gears at each end engaging the jack gears; means for driving one of said shafts; and axle supporting arms mounted on said chassis and projecting under the chassis axles to lift the axles as the chassis is raised.

2. In combination a vehicle chassis; a plurality of jacks pendingly mounted on said chassis; each of said jacks comprising a housing pending from said chassis; a vertical rotatable sleeve in said housing; a core screw in said sleeve and having a foot at the lower end thereof; a vertically telescoping stay to prevent said foot and core screw from rotating with said sleeve; said stay comprising a series of tubes assembled in telescope fashion, the intermediate tube having an outstanding flange at its upper end and an internal retaining flange at its lower end, the outside tube having a retaining flange at its lower end and having its upper end mounted on the upper portion of said housing, the inside tube having an outstanding flange at its upper end and having its lower end mounted on said foot; said outstanding flanges being adapted to engage the retaining flanges of the adjacent larger tube, and preventing pulling apart of the stay.

3. In combination a vehicle chassis; four platforms mounted on said chassis near its respective corners; a jack pendingly mounted under each of said platforms; each platform being provided with an inner upturned vertical wall parallel to the longitudinal axis of the chassis and having transverse bearing holes therein; the transverse bearing holes in the walls of the two front and the two rear platforms being in transverse axial alignment; two platforms on the same side of the chassis each being provided with vertically upturned inner walls lying in planes substantially perpendicularly to the longitudinal axis of the chassis and having longitudinally axially aligned bearing holes thereon; a lengthwise shaft extending through said longitudinally axially aligned bearing holes and having miter gears at each end thereof engaging the respective jack gears; a front and a rear cross shaft each extending through the transverse axially aligned bearing holes in the walls near the front and rear ends of the chassis respectively and having miter gears at each end engaging the jack gears; and means for driving said shafts.

4. A combination as in claim 3; a cross member mounted on the two front platforms; said means comprising a miter toothed wheel mounted on the front cross shaft and between the platforms supporting it; and a miter pinion and shaft rotatably mounted on said member and engaging said wheel, and adapted to be turned by a hand crank.

5. A combination as in claim 3; a motor support transversely mounted on said chassis at a portion between the front and rear platforms; said means comprising a reversible motor mounted on support; a drive pulley on said lengthwise shaft; a belt connecting said pulley and said motor; and a reversing switch for said motor.

6. In combination a vehicle chassis; a plurality of platforms mounted on said chassis and each provided with an axially vertical bearing hole therethrough; a jack pendingly mounted under each of said platforms; each jack comprising a housing pendingly mounted on said chassis and having a threaded vertical opening at the bottom; an externally threaded vertical sleeve rotatably mounted in said threaded opening and receivable in said housing and provided with a longitudinal external drive slot and having internal threads of opposite pitch to the external threads; a tubular vertical drive member rotatably received in the space between said sleeve and housing and having its upper portion of reduced diameter projecting upwardly through and bearing in said holes and platform, said member having at the lower end an internal projection engaging said slot; a gear mounted on said upper portion of the drive member; a core screw engaging the internal threads of said sleeve and having a foot at the lower end; staying means to prevent said core screw from turning with said sleeve; and driving means for operating said jacks.

7. A jack comprising, in combination, an elevating platform having a boss pending therefrom, said boss and platform having a vertical bearing bore therethrough; a drive member having a hub downwardly extending into said bore, and having a threaded bore, a jack screw engaging the threads of said member and having a foot piece mounted on the lower end thereof; retaining means to hold said hub in said bearing bore; and means to prevent rotation of said jack screw.

8. In combination a vehicle having a chassis; a plurality of platforms mounted on said chassis, each platform having a boss pending therefrom, said boss and platform having a large vertical bearing bore extending through said platform and vertically into said boss, and having a radial slot communicating with said bore, the lower portion of said bore being of reduced diameter; the lower part of the boss having a radial threaded aperture communicating with said lower portion of the bore; a sprocket having a hub downwardly extending into said large bore, and having therein a threaded bore, said hub being provided with a circumferential groove at the lower portion thereof; a drive chain for said sprocket; a jack screw provided with a longitudinal groove and slidably received in said portion and engaging the threads of said sprocket; an angular retaining piece having one member projecting through said radial slot and engaging in said circumferential groove, and the other member provided with an aperture, a screw passing through said aperture of the retaining member and said threaded aperture and loosely engaging in said longitudinal groove to prevent rotation of said jack; and a foot mounted on the lower end of said jack screw.

9. In combination a vehicle chassis; platforms associated with said chassis substantially near the respective corner portions of the chassis, being provided with a large axially vertical hole therethrough; an axle supporting arm mounted on the under face each of said platform and each having a hole in axial alignment with said vertical hole; a jack pendingly mounted under each of said platforms and comprising an axially vertical rotary drive member in said holes, a hollow housing mounted to hang below said arm and provided at the lower end thereof with an opening; a vertical supporting member vertically movable through said opening and having a foot at the lower end; means operated by said drive member for raising or lowering the supporting member; a power means; and means driven by the power means for rotating said rotary drive members.

10. In combination a vehicle chassis comprising side members; platforms associated with said chassis substantially near the respective corner portions of the chassis, each of said platforms being mounted on the inner side faces of the side members; said platforms each being provided with a large axially vertical hole therethrough; an axle supporting arm mounted on the under face each of said platform and each having a hole in axial alignment with said vertical hole and projecting under the chassis axles; a jack pendingly mounted under each of said platforms and having an axially vertical rotary drive member projecting upwardly through said holes, each jack comprising a hollow housing mounted to hang below said arm and provided with a flange at the lower end thereof having an opening therein; a vertical supporting member vertically movable through said opening and having a foot at the lower end; means operated by said drive member and engaging said supporting member for raising or lowering the supporting member; a power means; means driven by the power means for rotating said rotary drive members; and means carried by said housing for preventing the foot and supporting member from rotating.

11. In combination a vehicle chassis comprising inwardly open channel side members; platforms associated with said chassis substantially near the respective corner portions of the chassis, each of said platforms having an upturned flange mounted on the inner side faces of the webs of the side members of the chassis; said platforms each being provided with a large axially vertical hole therethrough; an axle supporting arm mounted on the under face each of said platform and each having a hole in axial alignment with said vertical hole and projecting under the chassis axles and so arranged as to lift the axles as the chassis is raised and to allow free springing movement of the axles while the vehicle is in operation; a jack pendingly mounted under each of said platforms; and having an axially vertical rotary drive member projecting upwardly through said holes, each jack comprising a hollow housing mounted to hang below said arm and provided with a flange at the lower end thereof having an opening therein; means operated by said drive member and engaging said supporting member for raising or lowering the supporting member as the drive member is rotated in one direction or the other; means for preventing said foot from turning a power means carried by the chassis; and means driven by the power means for rotating all of said rotary drive members.

GASPARE CONTRINO.
GIUSEPPE CALLARI.